US007492989B2

(12) United States Patent
Heilmann et al.

(10) Patent No.: US 7,492,989 B2
(45) Date of Patent: Feb. 17, 2009

(54) HYBRID TRANSMISSION-REFLECTION GRATING

(75) Inventors: Ralf Heilmann, Dedham, MA (US); Mark Schattenburg, Wayland, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 260 days.

(21) Appl. No.: 11/439,080

(22) Filed: May 23, 2006

(65) Prior Publication Data

US 2007/0280595 A1 Dec. 6, 2007

(51) Int. Cl.
*G02B 6/34* (2006.01)
*G02B 1/10* (2006.01)

(52) U.S. Cl. ......................... 385/37; 359/586; 359/587; 359/589

(58) Field of Classification Search .................. 385/37; 359/558-575
See application file for complete search history.

(56) References Cited

U.S. PATENT DOCUMENTS

| | | | | |
|---|---|---|---|---|
| 5,705,321 A * | 1/1998 | Brueck et al. | ............... | 430/316 |
| 6,127,066 A * | 10/2000 | Ueda et al. | ..................... | 430/1 |
| 7,365,306 B2 * | 4/2008 | Nakayama | ............... | 250/252.1 |
| 2008/0130139 A1 * | 6/2008 | Oohara et al. | ............... | 359/754 |

FOREIGN PATENT DOCUMENTS

DE 197008800 5/2006

OTHER PUBLICATIONS

Hambach et al., "Efficient high-order diffraction o f extreme-ultra-violet light and soft x-rays by nanostructured volume gratings" Optics Letters, vol. 26, No. 15, Aug. 1, 2001, pp. 1200-1202.

Liu et al., "Depth-graded multilayers for application in transmission geometry as linear zone plates" Journal of Applied Physics 98, pp. 113159-1-113159-6, 2005.

Pfeiffer et al., "X-ray waveguides with multiple guiding layers" vol. 62, No. 24, Physical Review B, Dec. 15, 2000, pp. 16939-16943.

(Continued)

*Primary Examiner*—Hemang Sanghavi
(74) *Attorney, Agent, or Firm*—Gauthier & Connors LLP

(57) ABSTRACT

A hybrid transmission-reflection grating includes an array of essentially parallel principal interfaces, with each principal interface separating a first medium and a second medium. The first medium has a first index of refraction, and the second medium has a second index of refraction. The first medium allows for transmission of quantum-mechanical objects in excess of one percent of an incident number of quantum-mechanical objects. The array of principal interfaces has a spacing distance between adjacent principal interfaces. The first medium has a width in the direction normal to the principal interfaces, the width being less than the spacing distance. Each principal interface has a length such that either (1) the length is greater that the width divided by $\tan(2\theta_c)$, wherein $\theta_c$ is an critical angle of total external reflection for the quantum-mechanical objects at the principal interface, or (2) the length is greater that the width divided by $\tan(2\theta_c)$, wherein $\theta_c$ is a critical angle defined by $2\pi \sin(\theta_c)\sigma=\lambda$, with $\lambda$ being de Broglie wavelength of the quantum-mechanical objects and $\sigma$ being a roughness of the principal interface.

4 Claims, 3 Drawing Sheets

OTHER PUBLICATIONS

Pfeiffer et al., "New design schemes for x-ray waveguides based on multiple guiding layers and two-dimensional nano-structures", XP 002463299, pp. 193-202, 2001.
Schultz et al., "Design, fabrication, and performance of preferential-order volume grating waveguide couplers" XP-000928554, Applied Optics, Mar. 10, 2000, vol. 39 No. 8, pp. 1223-1232.
David et al., "Wavelength tunable diffractive transmission lens for hard x rays" Applied Physics Letters, vol. 79, No. 8, Aug. 20, 2001, pp. 1088-1090.
Kang et al., "High-efficiency diffractive x-ray optics from sectioned multilayers" Applied Physics Letters, vol. 86 No. 151109, 2005, pp. 151109-1-151109-3, Apr. 6, 2005.
Vinogradov et al., "Diffraction efficiency of layer transmission optics" quantum Electronics, vol. 25, No. 12, pp. 1178-1182, 1995.
Kopylov et al., "Diffraction phenomena inside thick Fresnel zone plates" Radio Science, vol. 31, No. 6 pp. 1815-1822, Dec. 1996.
Humbach et al., "Efficient high-order diffraction of extreme-ultra-violet light and soft x-rays by nanostructured volume gratings" Optics Letters, vol. 26, No. 15, pp. 1200-1202, Aug. 1, 2001.
Mazuelas et al., "Giant linear Fresnel Zone Plate as a hard X-ray condenser" Design and Microfabrication of Novel X-Ray Optics II, vol. 5539, pp. 259-263, 2004.
Schneider, "Zone plates with high efficiency in high orders of diffraction described by dynamical theory" Appl. Phys. Letters, vol. 71, No. 16, pp. 2242-2244, Oct. 20, 1997.
Ceglio et al., "Demonstration of guided-wave phenomena at extreme-ultraviolet and soft-x-ray wavelengths" Optical Society of America, vol. 13, No. 4, pp. 267-269, Apr. 1988.
Maser et al., Multilayer Laue Lenses as High-Resolution X-rays Optics, Design and Microfabrication of Novel X-Ray Optics II, vol. 5539, pp. 185-194, 2004.
Fechtchenko et al., "Optical properties of sliced multilayer gratings" Optics Communications, vol. 210, pp. 179-186, Sep. 15, 2002.
Ocola et al., "Tapered tilted linear zone plates for focusing hard x-rays" Design and Microfabrication of Novel X-Ray Optics II, vol. 5539, pp. 165-173, 2004.
Naulleau et al. , "Transmission phase gratings for EUV interferometry" Journal of Synchroton Radiation, vol. 7 pp. 405-410, 2000.
David et al., "Wet-etched diffractive lenses for hard X-rays" Journal of Synchroton Radiation, vol. 8, pp. 1054-1055, 2001.
Prudnikov, "X-ray guided modes produced by BRAGG reflections of multilayers: an analytical treatment" Journal of Applied Crystallography, vol. 38, pp. 595-602, 2005.

* cited by examiner

HYBRID TRANSMISSION-REFLECTION GRATING

GOVERNMENT RIGHTS NOTICE

The present invention was made with US Government support under Grant (Contract) Number, NAG5-5405, awarded by the US National Aeronautics and Space Administration. The US Government has certain rights to this invention.

FIELD OF THE PRESENT INVENTION

The present invention is directed to the manipulation of quantum-mechanical objects of suitable wavelength via the intersection of a periodic structure with the object's trajectory. More particularly, the present invention is directed to a hybrid transmission-reflection grating that is capable of manipulating electromagnetic waves, atoms and molecules, both neutral and charged, and subatomic particles.

BACKGROUND OF THE PRESENT INVENTION

Conventionally, diffraction gratings are spatially periodic structures that can be separated into reflection gratings and transmission gratings.

With respect to reflection gratings, the diffracted orders of interest are on the same side of the grating as the incident and reflected objects. Moreover, since reflection gratings rely upon reflection, the thickness of the actual grating generally is not an issue.

On the other hand, with respect to a transmission grating, the diffracted orders of interest and the transmitted objects are located on one side of the grating, and the incident objects are located on the other side of the grating. Due to the transmission property of the grating, transmission gratings must be thin and/or sufficiently transparent to allow useful transmission.

Conventionally, reflection gratings used in grazing-incidence geometry are very efficient for many kinds of objects (x rays, neutrons, atoms, etc.) that are normally difficult to diffract. In such circumstances, the angle between the incident object's trajectory and the grating surface (the so-called graze angle or angle of grazing-incidence) is very small.

One disadvantage of grazing-incidence reflection gratings is the large required length of the gratings (e.g., relative to the incident beam diameter). Moreover, variations in the slope of the reflection grating surface or slight misalignments lead to proportional changes in the angles of reflection and diffraction of the quantum-mechanical objects. Furthermore, any non-flatness in the grating surface reduces the spectral resolution of the grating and the imaging resolution, if the grating is part of an imaging system. Lastly, if several reflection gratings contribute to a single image or spectrum, the resolution of the image or spectrum generated by the quantum-mechanical objects is sensitive to the mutual alignment between the gratings.

On the other hand, transmission gratings are most efficient at normal incidence, since the amount of absorbing material that the quantum-mechanical objects traverse is minimized. Transmission gratings have the advantage that the transmitted (zero-order) beam is not deflected, which is very useful for integration in imaging applications. Transmission gratings used near normal incidence are forgiving in terms of non-flatness and misalignment.

For example, if the local grating surface's normal deviates from the incident beam direction by a small angle $\alpha$, the diffracted beam angles will only change on the order of $\alpha(\lambda/p)^2$, with $\lambda$ being the wavelength and p being the grating period. For an x-ray transmission grating the term $(\lambda/p)^2$ could be as small as $10^{-7}$ to $10^{-8}$.

One disadvantage of transmission gratings, especially at shorter wavelengths, is high absorption. Another disadvantage of transmission gratings, at shorter wavelengths, is low diffraction efficiency. Even free-standing transmission gratings, where the grating consists of an alternating array of bars and non-absorbing empty space, only achieve efficiencies around 20% in first order in the x-ray band over a limited bandwidth.

Therefore, it is desirable to provide a grating that is substantially insensitive to any non-flatness in the grating surface. Moreover, it is desirable to provide a grating that is substantially insensitive to misalignment. Furthermore, it is desirable to provide a grating that has relatively low absorption. Lastly, it is desirable to provide a grating that has high diffraction efficiency over a broad band of wavelengths.

SUMMARY OF THE PRESENT INVENTION

A first aspect of the present invention is a hybrid transmission-reflection grating. The hybrid transmission-reflection grating includes an array of essentially parallel principal interfaces, with each principal interface separating a first medium and a second medium. The first medium has a first index of refraction, and the second medium has a second index of refraction. The first medium allows for transmission of quantum-mechanical objects in excess of one percent of an incident number of quantum-mechanical objects. The array of principal interfaces has a spacing distance between adjacent principal interfaces. The first medium has a width in the direction normal to the principal interfaces, the width being less than the spacing distance. Each principal interface has a length such that the length is greater than the first medium's width divided by $\tan(2\theta_c)$, wherein $\theta_c$ is a critical angle of total external reflection for the quantum-mechanical objects at the principal interface.

A second aspect of the present invention is the use of a hybrid transmission-reflection grating. The hybrid transmission-reflection grating includes an array of essentially parallel principal interfaces, with each principal interface separating a first medium and a second medium. The first medium has a first index of refraction, and the second medium has a second index of refraction. The first medium allows for transmission of quantum-mechanical objects in excess of one percent of an incident number of quantum-mechanical objects. The array of principal interfaces has a spacing distance between adjacent principal interfaces. The first medium has a width in the direction normal to the principal interfaces, the width being less than the spacing distance. Each principal interface has a length such that the length is greater than the first medium's width divided by $\tan(2\theta_c)$, wherein $\theta_c$ is a critical angle defined by $2\pi \sin(\theta_c)\sigma=\lambda$, with $\lambda$ being the de Broglie wavelength of the quantum-mechanical objects and $\sigma$ being the roughness of the principal interface.

A third aspect of the present invention is a method of fabricating a hybrid transmission-reflection grating. The method anisotropically etches slots into a silicon substrate, with a mask aligned to {111} planes on the silicon substrate.

A fourth aspect of the present invention is a method of diffracting quantum-mechanical objects. The method provides a hybrid transmission-reflection grating having an array of essentially parallel principal interfaces, with each principal interface separating a first medium and a second medium, the first medium having a first index of refraction and the second medium having a second index of refraction, the first medium allowing for transmission of quantum-mechanical objects in excess of one percent of an incident number of quantum-mechanical objects, the array of principal interfaces having a spacing distance between adjacent principal interfaces, the first medium having a width in the direction normal to the principal interfaces, the width being less than the spacing distance, each principal interface having a length such that the length is greater than the first medium's width divided by $\tan(2\theta_c)$, wherein $\theta_c$ is an critical angle of total external reflection for the quantum-mechanical objects at the principal interface, and causes the quantum-mechanical objects to be incident upon the array of essentially parallel principal interfaces at graze angles between $0.05\theta_c$ and $2\theta_c$.

A fifth aspect of the present invention is a method of diffracting quantum-mechanical objects. The method provides a hybrid transmission-reflection grating having an array of essentially parallel principal interfaces, with each principal interface separating a first medium and a second medium, the first medium having a first index of refraction and the second medium having a second index of refraction, the first medium allowing for transmission of quantum-mechanical objects in excess of one percent of an incident number of quantum-mechanical objects, the array of principal interfaces having a spacing distance between adjacent principal interfaces, the first medium having a width in the direction normal to the principal interfaces, the width being less than the spacing distance, each principal interface having a length such that the length is greater than the first medium's width divided by $\tan(2\theta_c)$, wherein $\theta_c$ is a critical angle defined by $2\pi \sin(\theta_c) \sigma=\lambda$, with $\lambda$ being de Broglie wavelength of the quantum-mechanical objects and $\sigma$ being a roughness of the principal interface, and causes the quantum-mechanical objects to be incident upon the array of essentially parallel principal interfaces at graze angles between $0.05\theta_c$ and $2\theta_c$.

BRIEF DESCRIPTION OF THE DRAWINGS

The present invention may take form in various components and arrangements of components, and in various steps and arrangements of steps. The drawings are only for purposes of illustrating a preferred embodiment and are not to be construed as limiting the present invention, wherein.

DETAILED DESCRIPTION OF THE PRESENT INVENTION

Figure 1:
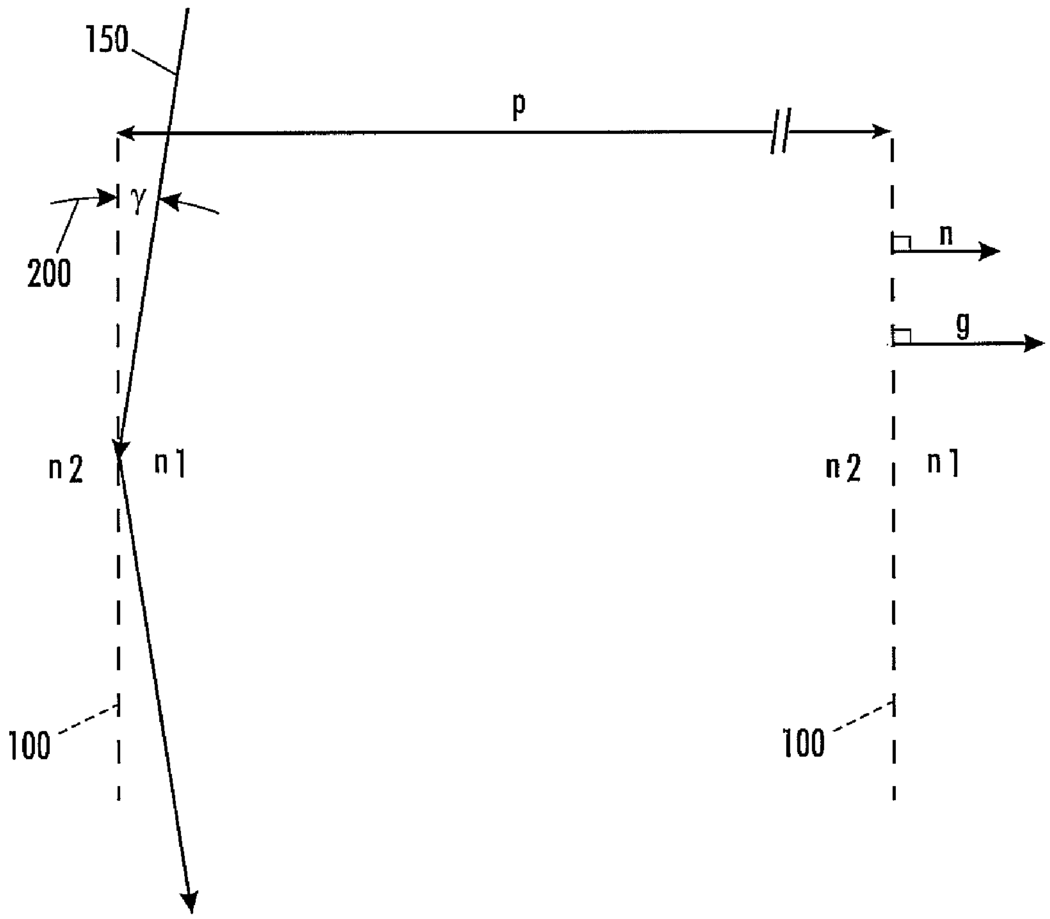
FIG. 1 is a representation of a hybrid transmission-reflection grating according to the concepts of the present invention.

The present invention will be described in connection with preferred embodiments; however, it will be understood that there is no intent to limit the present invention to the embodiments described herein. On the contrary, the intent is to cover all alternatives, modifications, and equivalents as may be included within the spirit and scope of the present invention, as defined by the appended claims.

For a general understanding of the present invention, reference is made to the drawings. In the drawings, like reference have been used throughout to designate identical or equivalent elements. It is also noted that the various drawings illustrating the present invention may not have been drawn to scale and that certain regions may have been purposely drawn disproportionately so that the features and concepts of the present invention could be properly illustrated.

As noted above, it is desirable to provide a grating that is substantially insensitive to any non-flatness in the grating surface. The grating surface for a hybrid transmission-reflection grating is defined as the connection of the ends of neighboring principal interfaces. The grating normal $n_s$ is defined as the normal of the grating surface. Moreover, it is desirable to provide a grating that is substantially insensitive to misalignment. Furthermore, it is desirable to provide a grating that has relatively low absorption. Additionally, it is desirable to provide a grating that diffracts efficiently. Lastly, it is desirable to provide a grating that is efficient over a broad range of wavelengths.

Furthermore, as noted above, the present invention realizes a hybrid transmission-reflection grating that enables reflection, transmission, and diffraction of electromagnetic radiation and particles with greater efficiency and over a wider range of wavelengths.

The present invention relates, in general, to the manipulation of quantum-mechanical objects of suitable wavelength via the intersection of a periodic structure with the object's trajectory. More particularly, the present invention relates to hybrid transmission-reflection gratings, which combine the advantages of transmission and reflection gratings, to manipulate quantum-mechanical objects of suitable wavelength.

Figure 2:
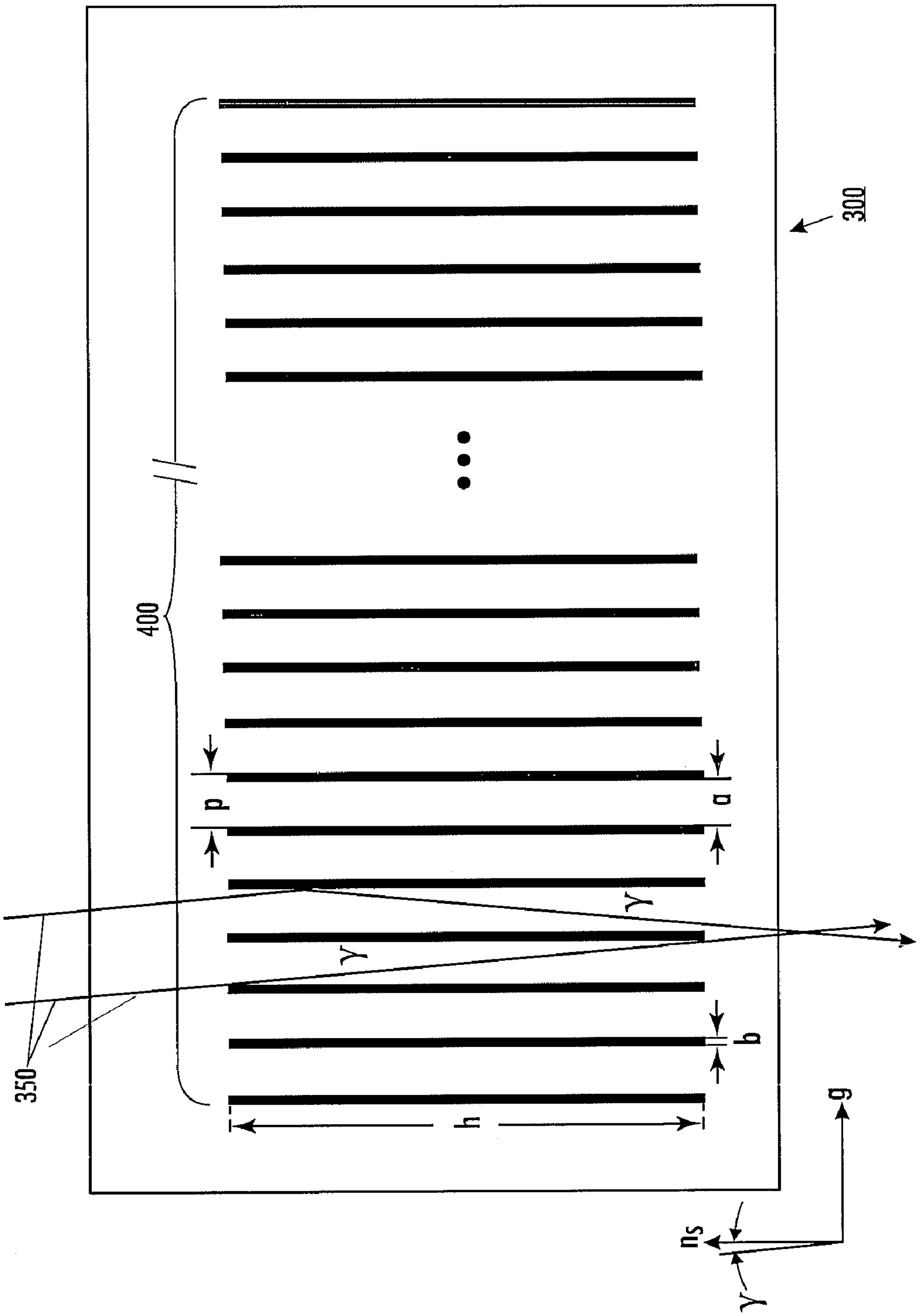
FIG. 2 is another representation of a hybrid transmission-reflection grating according to the concepts of the present invention.
Figure 3:
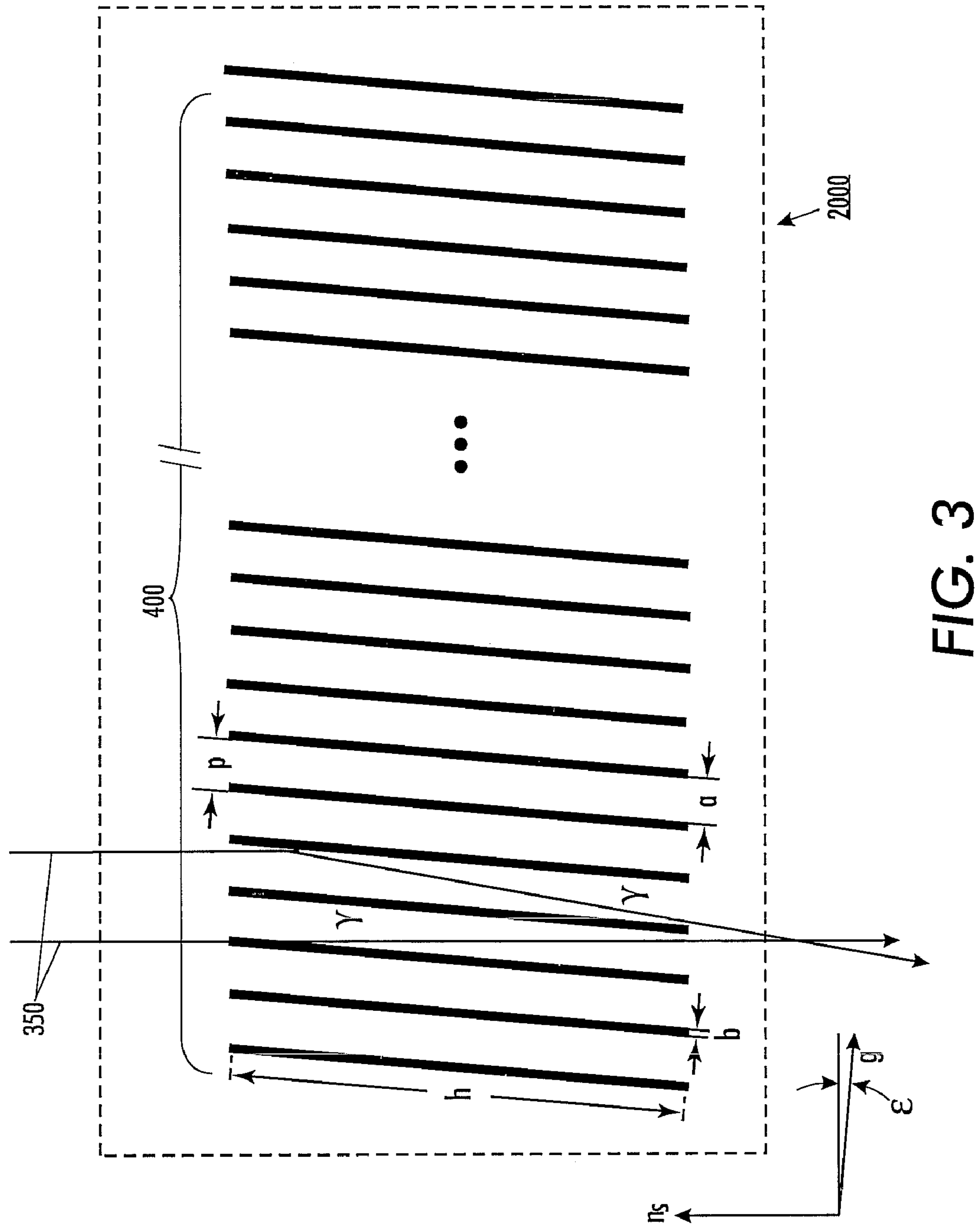
FIG. 3 is another representation of a hybrid transmission-reflection grating according to the concepts of the present invention.

In general, hybrid transmission-reflection gratings can consist of any number of media with any number of indices of refraction, and of media with continuous ranges of indices of refraction. For simplicity of discussion the hybrid transmission-reflection gratings illustrated in FIGS. 2 and 3 are simple specific embodiments of the current invention with only two indices of refraction. The medium on the incident side has an index of refraction $n_1$ and is air or vacuum, and the medium on the other side of the interface with index $n_2$ is a solid. The principal interfaces are the surfaces separating the two media on the sides where quantum-mechanical objects are incident.

A hybrid transmission-reflection grating 300, as illustrated in FIG. 2, includes a densely stacked array 400 of thin parallel plates, or equivalently, an array of wide parallel slots with thin separating walls. Quantum-mechanical objects 350, such as electromagnetic waves or neutrons or atoms, impinge on the array 400 of thin parallel plates or wide parallel slots at grazing incidence (graze angle $\gamma$) relative to the principal interfaces as illustrated in FIG. 2.

It is further noted that, in FIG. 2, the angle of incidence relative to grating normal $n_s$ is $\gamma$. Moreover, in FIG. 2, the angle of specular reflection off the principal interfaces is $\gamma$. Lastly, in FIG. 2, the grating vector is g.

FIG. 3 illustrates another hybrid transmission-reflection grating 2000 that includes a densely stacked array 1000 of thin parallel plates, or equivalently, an array of wide parallel slots with thin separating walls. Quantum-mechanical objects 350, such as electromagnetic waves or neutrons or atoms, impinge on the array 1000 of thin parallel plates or wide parallel slots at grazing incidence (graze angle $\gamma$) relative to the principal interfaces as illustrated in FIG. 3.

It is further noted that, in FIG. 3, the angle of incidence relative to grating normal $n_s$ is 0. Moreover, in FIG. 3, the angle of specular reflection off the principal interfaces is $\gamma$. Furthermore, in FIG. 3, the grating vector is g.

The period of the grating, p, as illustrated in FIG. 2, is given by the sum of the distance between two plates (gap width a as illustrated in FIGS. 2 and 3) and the thickness of a plate b as illustrated in FIGS. 2 and 3. The period of the grating, p, should be small enough to allow for diffraction at suitable angles given by the grating equation $m\lambda=p(\sin\alpha-\sin\beta_m)$, where m=0, 1, −1, 2, −2, . . . , and α and $\beta_m$ are the angles of incidence and of the $m^{th}$ order diffracted beam, respectively, from the grating normal $n_s$. The grating illustrated in FIG. 2 is for the case that α=γ. The grating illustrated in FIG. 3 has an effective period p'=p/cos(□), with □ being the angle between the local grating vector g and the surface of the grating. FIG. 3 shows the case of normal incidence (α=0) and □=□.

When the directions of specular reflection from a principal interface and diffraction from the grating structure coincide (($\gamma=\beta_m$) in FIG. 2 and ($2\gamma=\beta_m$) in FIG. 3) enhanced diffraction intensity occurs. A similar condition is commonly applied to reflection gratings, producing an enhancement, or "blaze", of diffraction efficiency in that direction. This condition is commonly called the blaze condition, and a reflection grating that meets this condition is commonly called a blazed reflection grating.

It is noted that the length or height, h, as illustrated in FIGS. 2 and 3, of the plates or slots of the arrays 400 and 1000 should be long enough in the direction of the incident quantum-mechanical objects for a significant fraction of quantum-mechanical objects to be intercepted for high diffraction efficiency, unless a stronger $0^{th}$ order transmitted beam is desired. If all quantum-mechanical objects are to be intercepted, h≧a/tan(γ).

With respect to FIGS. 2 and 3, quantum-mechanical objects incident on the hybrid transmission-reflection grating are mostly reflected back or absorbed if the quantum-mechanical objects hit the narrow sides of one of the plates (percentage of incident quantum-mechanical objects lost for transmission=b/p). On the other hand the quantum-mechanical objects that hit one of the principal interfaces of 400 or 1000 at graze angle γ can contribute efficiently to the total transmission (effective transmission as large as a/p).

It is noted that if the graze angle γ is not much larger than the critical angle $\theta_c$ for a given principal interface and quantum-mechanical object wavelength, highly efficient reflection off of the principal interfaces can be realized.

Thus, the hybrid transmission-reflection grating of FIGS. 2 and 3 should have a transmission efficiency (sum of all transmitted intensity divided by incident intensity) close to a/p. More specifically, making the plates of the hybrid transmission-reflection grating of FIGS. 2 and 3 as thin as possible, so that a approaches p, the efficiency can approach 100%.

Utilizing the hybrid transmission-reflection grating of FIGS. 2 and 3, diffraction efficiencies can be achieved comparable to highly efficient blazed reflection gratings over a broad spectral range, utilizing only the diffraction orders on one side of the $0^{th}$ transmitted order. The hybrid transmission-reflection grating of FIGS. 2 and 3 would enable a spectrum detector to be reduced in size roughly by a factor of two without any loss in signal or dispersion compared to a traditional transmission grating with the same period. Alternatively, reducing the period of a hybrid transmission-reflection grating by a factor of two relative to a traditional transmission grating would result in a spectrum with the same spatial extent, but twice the dispersion.

It is further noted that the hybrid transmission-reflection grating of FIGS. 2 and 3 could be utilized as a high-efficiency blazed transmission grating, thereby realizing the advantages and applications of a blazed grating in wavelength regions where grating material and quantum-mechanical object properties have previously prevented the fabrication of such gratings.

Moreover, it is noted that the directions of the transmitted orders of the hybrid transmission-reflection grating of FIGS. 2 and 3 are governed by the grating equation for a transmission grating, thus the directions of the transmitted orders are less sensitive to non-flatness and misalignment than in the case of reflection gratings.

The hybrid transmission-reflection grating of FIGS. 2 and 3 works with neutrons and with x rays. In both cases, the indices of refraction can be written as:

$$n_j=1-\delta_j+i\beta_j.$$

and the critical angle is defined as in the case of x rays.

For neutrons $\delta_j=\lambda^2 b_{s,j}\rho_j/(2\pi)$, where $\lambda=h_P/(m_n v)$ is the de Broglie wavelength, $h_P$=Planck's constant, $m_n$=neutron mass, v=neutron velocity, $b_{s,j}$ is the scattering length, and $\rho_j$ is the unit number density of the medium j. For neutrons at thermal equilibrium at temperature T one can also write $\lambda=h_P/(3k_B T m_n)^{1/2}$ ($k_B$=Boltzmann constant), For room temperature neutrons, λ≈0.18 nm. For an air-silicon interface, this corresponds to $\delta\approx10^{-6}$, and a critical angle of total external reflection $\theta_c\approx(2\delta)^{1/2}$=1.4 mrad=0.08 deg. (For $SiO_2$, δ is about twice the value for Si, yielding a critical angle about 1.4 times larger.)

The critical angle increases linearly with wavelength and can exceed 1 deg for sub-thermal ("cold") neutrons and with suitable material choices for the hybrid transmission-reflection grating. Additionally, since neutron absorption is practically negligible for~10 μm thin gratings, a hybrid transmission-reflection grating can consist of alternating layers of solid (or liquid) materials, such as Ni and Ti (which are used as multilayer coatings for neutron "supermirrors"), without any air gaps. The negligible neutron absorption also eliminates potential constraints on the ratio a/p.

The hybrid transmission-reflection gratings of FIGS. 2 and 3 can be useful for neutron, x-ray, atom, electron, molecular, or other quantum-mechanical object interferometry or as beam splitters, among other things.

It is noted that atoms and molecules, whether in an excited state or in the ground state, and whether charged/ionized or not, and electrons also have a de Broglie wavelength as defined above for the case of neutrons.

The equation for the wavelength λ again can be written as:

$$\lambda=h_P/(m_p v)$$

where $m_p$ is the mass of the particle and v its velocity. Atoms are known to reflect efficiently from smooth surfaces at grazing incidence. More specifically, it is generally known that specular reflectivity is high when the surface roughness σ is no greater than the "effective" wavelength of the particle in the direction normal to the surface. This condition can be expressed in terms of the particle's wave vector k=2π/λ such that k sin(□) σ≦1, where □ is the grazing angle of incidence. In principle, even a very rough surface will reflect efficiently as long as □ is small enough.

For anisotropically etched Si (111) planes, for example, roughness is often observed to be on the order of 0.2 nm or less. In that case, efficient reflection of room temperature He atoms at angles θ<3 degrees may be realized.

Thus, hybrid transmission-reflection gratings can become highly useful elements in atom optics. For low temperature experiments, particle wavelengths become longer, further relaxing requirements on period and roughness of a hybrid transmission-reflection grating.

The hybrid transmission-reflection grating can enable compact and high signal-to-noise atom interferometry setups and complement or improve upon other atom optics elements such as shallow transmission gratings or evanescent wave mirrors.

The hybrid transmission-reflection grating can efficiently diffract those atoms and molecules that are difficult to manipulate with light fields due to their lack of strong laser-accessible transitions.

Surface-particle interaction potential models can be refined for ground state, excited, and ionized particles based on hybrid transmission-reflection grating diffraction patterns. Moreover, a hybrid transmission-reflection grating can be useful in the study of quantum reflection.

In manufacturing the hybrid transmission-reflection grating of FIGS. 2 and 3, to achieve high reflectivity off the plates or principal interfaces, the principal interfaces need to be smooth and the angles of incidence $\gamma$ have to be rather small (on the order of 1-2 degrees or less for x rays, depending on wavelength and facet material). Thus, long transmission "channels" between the facets are required. Typically, the transmission "channels" have aspect ratios h/a of 20 or higher.

At the same time, blocking of incident quantum-mechanical objects along the sides of the plates should be minimized, requiring the smallest values for b possible. For example, if b/p=0.125, the aspect ratio h/b typically should be 140 or higher.

It is noted that short wavelength quantum-mechanical objects require small grating periods to achieve significant angular separation between diffracted orders.

For example, a highly efficient hybrid transmission-reflection grating as shown in FIGS. 2 and 3, made of silicon for x rays in the wavelength range of 2-10 nm could have the following parameters:

Grating period p=400 nm
Plate thickness b=80 nm
Grating thickness h=18.33 μm
Graze angle $\gamma$=1.0 deg
Plate aspect ratio h/b≈230

The highly efficient hybrid transmission-reflection grating can be fabricated in silicon, using anisotropic etching in KOH or other aqueous alkaline solutions (NaOH, tetramethyl ammonium hydroxide (TMAH)-based etchants, hydrazine, EDP, etc.). In this process, the {110} surfaces of a silicon crystal are etched, leaving atomically smooth {111} surfaces behind.

More specifically, with etch masks, carefully aligned to the {111} planes on a silicon wafer, deep slots are etched into a {110} surface. The silicon wafer can be prepared with a buried oxide (BOX) layer as an etch stop at a depth given by the desired grating thickness. After etching through to the etch stop, the grating may be freed from the wafer through etching in HF.

For the hybrid transmission-reflection grating to be stiff and mechanically connected, the hybrid transmission-reflection grating may need a supporting structure that connects the grating plates or facets with each other. This supporting structure can be defined in the mask for the anisotropic etch, which results in an integrated silicon supporting structure.

Alternatively, other supporting structures on top (i.e. on the incident side of the grating surface) or below (i.e. on the side of the grating where transmitted quantum-mechanical objects emerge) or within the hybrid transmission-reflection grating can be used.

While silicon crystals can achieve a microscopic structure with high anisotropy ratios, silicon might not be an ideal reflector for certain quantum-mechanical objects. In such situations, the silicon surfaces are coated with a thin layer of another material such as nickel, iridium, platinum, gold, etc., an alloy, or even a multilayer structure.

It is noted that the hybrid transmission-reflection grating can be fabricated from other crystalline or non-crystalline materials.

As illustrated in FIGS. 1 through 3, the hybrid transmission-reflection grating is a three-dimensional structure. While FIGS. 2 and 3 show the hybrid transmission-reflection grating with essentially one-dimensional periodicity, it is not limited to embodiments with one-dimensional periodicity. As illustrated in FIG. 1, its function is defined by a sequence of essentially parallel principal interfaces 100, separated from each other by a distance p in the direction normal to the parallel principal interfaces 100. Each parallel principal interface 100 separates a medium of index of refraction $n_1$ on one side from a medium of index $n_2$ on the other side. The local grating vector g is in the direction of the normal of a local parallel principal interface 100 and has magnitude $2\pi/p$. Going from one parallel principal interface to its neighboring parallel principal interface, the index can take on other values besides $n_1$ and $n_2$.

The ends of the parallel principal interfaces can line up with each other (as illustrated in FIG. 2), or the parallel principal interfaces can be shifted relative to each other arbitrarily in a systematic (as illustrated in FIG. 3) or non-systematic fashion in any direction perpendicular to the parallel principal interface's normal n.

As illustrated in FIG. 1, quantum-mechanical objects 150 are incident onto the parallel principal interfaces 100 from the side with index $n_1$ at a graze angle 200 ($\gamma$). The absorption on the incident side of the parallel principal interface is small enough to allow for sufficient transmission of incident quantum-mechanical objects through the medium or media on the incident side of the parallel principal interface. The width of the sufficiently transmitting region in the direction normal to the parallel principal interfaces is a. The width a is not greater than p.

Examples of quantum-mechanical objects are electromagnetic waves or photons of any wavelength, atoms and molecules, both charged and neutral, and charged and neutral subatomic particles (for example neutrons, etc.). For x rays a critical angle of total external reflection $\theta_c$ relative to the plane of the interface 100 (measured similar to grazing angle 200) can be defined as $$\theta_c \approx (2(\delta_2 - \delta_1))^{1/2},$$

where the complex indices of refraction are $n_j = 1 - \delta_j + i\beta_j$. (j=1, 2), $\delta_j$ and $\beta_j$ are proportional to the real and imaginary parts of the media's complex atomic scattering factors, respectively.

With respect to gratings, any grating can be used where $p/h \leqq \tan(2\theta_c)$, with h being the length of a parallel principal interface along the projection of a quantum-mechanical object's trajectory onto the parallel principal interface. Moreover, a grating can be used where $a/h \leqq \tan(2\theta_c)$.

High diffraction efficiency over a broad range of wavelengths of quantum-mechanical objects is achieved when the quantum-mechanical objects are incident on the parallel principal interfaces at angles in the vicinity of the critical angle $\theta_c$ as defined above for x rays and other electromagnetic radiation, and for neutrons and other particles (atoms, molecules, etc.).

The hybrid transmission-reflection gratings are utilized whenever quantum-mechanical objects are incident on the parallel principal interfaces at graze angles between $0.05\theta_c$ and $2\theta_c$.

The hybrid transmission-reflection grating, as described above, can be utilized in a variety of situations. For example, the hybrid transmission-reflection grating may be utilized for x-ray spectroscopy in telescopes and microscopes.

Moreover, the hybrid transmission-reflection grating may form a beam splitter for x rays and other short wavelength quantum-mechanical objects. In this situation, the intensity ratio between two selected transmitted orders can be changed continuously by rotating the hybrid transmission-reflection grating around an axis perpendicular to the grating vector and the incident wave vector with minimal change in the direction of the diffracted beams.

Furthermore, the hybrid transmission-reflection grating may form a low pass energy filter or be used in interference lithography. Also, the hybrid transmission-reflection grating may form a blazed transmission grating for atom optics, a short period/large diffraction angle/high dispersion broad-band blazed transmission grating, or a translation-free variable-ratio two-beam splitter at certain wavelength-to-period ratios. Lastly, the hybrid transmission-reflection grating may be used for x-ray, atom, neutron, or other quantum-mechanical object interference with relaxed alignment tolerances.

While various examples and embodiments of the present invention have been shown and described, it will be appreciated by those skilled in the art that the spirit and scope of the present invention are not limited to the specific description and drawings herein, but extend to various modifications and changes.

What is claimed is:

1. A hybrid transmission-reflection grating, comprising:

an array of essentially parallel principal interfaces, with each principal interface separating a first medium and a second medium, said first medium having a first index of refraction and said second medium having a second index of refraction, said first medium allowing for transmission of quantum-mechanical objects in excess of one percent of an incident number of quantum-mechanical objects;

said array of principal interfaces having a spacing distance between adjacent principal interfaces;

said first medium having a width in the direction normal to said principal interfaces, said width being less than said spacing distance;

each principal interface having a length such that said length is greater that said width divided by $\tan(2\theta_c)$, wherein $\theta_c$ is the critical angle of total external reflection for the quantum-mechanical objects at said principal interface.

2. A hybrid transmission-reflection grating, comprising:

an array of essentially parallel principal interfaces, with each principal interface separating a first medium and a second medium, said first medium having a first index of refraction and said second medium having a second index of refraction, said first medium allowing for transmission of quantum-mechanical objects in excess of one percent of an incident number of quantum-mechanical objects;

said array of principal interfaces having a spacing distance between adjacent principal interfaces;

said first medium having a width in the direction normal to said principal interfaces, said width being less than said spacing distance;

each principal interface having a length such that said length is greater that said width divided by $\tan(2\theta_c)$, wherein $\theta_c$ is a critical angle defined by $2\pi\sin(\theta_c)\sigma=\lambda$, with $\lambda$ being the de Broglie wavelength of the quantum-mechanical objects and $\sigma$ being the roughness of said principal interface.

3. A method of diffracting quantum-mechanical objects, comprising:

(a) providing a hybrid transmission-reflection grating having an array of essentially parallel principal interfaces, with each principal interface separating a first medium and a second medium, the first medium having a first index of refraction and the second medium having a second index of refraction, the first medium allowing for transmission of quantum-mechanical objects in excess of one percent of an incident number of quantum-mechanical obj ects, the array of principal interfaces having a spacing distance between adjacent principal interfaces, the first medium having a width in the direction normal to the principal interfaces, the width being less than the spacing distance, each principal interface having a length such that the length is greater that the width divided by $\tan(2\theta_c)$, wherein $\theta_c$ is the critical angle of total external reflection for the quantum-mechanical objects at the principal interface; and (b) causing the quantum-mechanical objects to be incident upon the array of essentially parallel principal interfaces at graze angles between $0.05\theta_c$ and $2\theta_c$.

4. A method of diffracting quantum-mechanical objects, comprising:

(a) providing a hybrid transmission-reflection grating having an array of essentially parallel principal interfaces, with each principal interface separating a first medium and a second medium, the first medium having a first index of refraction and the second medium having a second index of refraction, the first medium allowing for transmission of quantum-mechanical objects in excess of one percent of an incident number of quantum-mechanical objects, the array of principal interfaces having a spacing distance between adjacent principal, interfaces, the first medium having a width in the direction normal to the principal interfaces, the width being less than the spacing distance, each principal interface having a length such that the length is greater that the width divided by $\tan(2\theta_c)$, wherein $\theta_c$ is a critical angle defined by $2\pi\sin(\theta_c)\ \sigma=\lambda$, with $\lambda$ being the de Broglie wavelength of the quantum-mechanical objects and a being the roughness of the principal interface; and (b) causing the quantum-mechanical objects to be incident upon the array of essentially parallel principal interfaces at graze angles between $0.05\theta_c$ and $2\theta_c$.

* * * * *

UNITED STATES PATENT AND TRADEMARK OFFICE

CERTIFICATE OF CORRECTION

PATENT NO. : 7,492,989 B2
APPLICATION NO. : 11/439080
DATED : February 17, 2009
INVENTOR(S) : Heilmann et al.

It is certified that error appears in the above-identified patent and that said Letters Patent is hereby corrected as shown below:

Please insert the following corrected sentences at Column 5, beginning at line 7:

--The grating illustrated in FIG. 3 has an effective period p' = p / cos (ε), with ε being the angle between the local grating vector g and the surface of the grating. FIG. 3 shows the case of normal incidence (α = 0) and ε = γ.--

Please insert the following corrected sentences at Column 6, beginning at line 52:

--This condition can be expressed in terms of the particle's wave vector k = 2π /λ, such that k sin(γ) σ ≤ 1, where γ is the grazing angle of incidence. In principle, even a very rough surface will reflect efficiently as long as γ is small enough.--

Signed and Sealed this

Thirty-first Day of March, 2009

John Doll

JOHN DOLL
*Acting Director of the United States Patent and Trademark Office*